United States Patent
Ogawa

(10) Patent No.: US 11,172,094 B2
(45) Date of Patent: Nov. 9, 2021

(54) INFORMATION PROCESSING APPARATUS THAT CAN APPLY A PRICE SET FOR ONE SHEET TYPE TO ANOTHER SHEET TYPE, AND METHOD OF CONTROLLING THE SAME

(71) Applicant: CANON KABUSHIKI KAISHA, Tokyo (JP)

(72) Inventor: Nobuhiro Ogawa, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/015,440

(22) Filed: Sep. 9, 2020

(65) Prior Publication Data
US 2021/0084191 A1    Mar. 18, 2021

(30) Foreign Application Priority Data

Sep. 13, 2019 (JP) .............................. JP2019-167489

(51) Int. Cl.
*H04N 1/00* (2006.01)
*H04N 1/34* (2006.01)

(52) U.S. Cl.
CPC ......... *H04N 1/344* (2013.01); *H04N 1/00421* (2013.01); *H04N 1/00427* (2013.01); *H04N 1/00474* (2013.01); *H04N 1/00482* (2013.01)

(58) Field of Classification Search
None
See application file for complete search history.

(56) References Cited

U.S. PATENT DOCUMENTS

| 9,575,451 | B2* | 2/2017 | Tsujita | .................. | G03G 15/502 |
| 2008/0158582 | A1* | 7/2008 | Uotani | ................... | G06F 3/1285 |
| | | | | | 358/1.13 |
| 2011/0135322 | A1* | 6/2011 | Masuyama | ............ | B41J 11/485 |
| | | | | | 399/16 |

(Continued)

FOREIGN PATENT DOCUMENTS

| JP | 2008-027216 A | 2/2008 |
| JP | 2010244333 A | 10/2010 |

(Continued)

OTHER PUBLICATIONS

Japanese Office Action dated Oct. 23, 2020 in counterpart Japanese patent application No. 2019-167489.

(Continued)

*Primary Examiner* — Henok Shiferaw
(74) *Attorney, Agent, or Firm* — Venable LLP

(57) ABSTRACT

An information processing apparatus is provided. The apparatus comprises at least one processor; and at least one memory configured to store a program, wherein the program when executed by the processor causes the information processing apparatus to perform operations, the operation comprising acquiring information of a sheet type used by an image output apparatus; providing a setting screen configured to accept setting operation for sheet types supported by the image output apparatus; and on the setting screen, among the sheet types supported by the image output apparatus, displaying the used sheet type indicated by the acquired sheet type information with priority over other sheet types.

16 Claims, 10 Drawing Sheets

(56) References Cited

U.S. PATENT DOCUMENTS

| | | | |
|---|---|---|---|
| 2011/0150551 A1* | 6/2011 | Oba | G03G 15/655 400/582 |
| 2013/0321865 A1* | 12/2013 | Hikichi | G06K 15/4065 358/1.15 |
| 2014/0268234 A1* | 9/2014 | Iida | G06K 15/4065 358/1.15 |
| 2015/0062635 A1* | 3/2015 | Anno | G06K 15/4065 358/1.15 |
| 2015/0062646 A1* | 3/2015 | Hikichi | H04N 1/0032 358/1.15 |
| 2015/0172483 A1* | 6/2015 | Kishida | H04N 1/0048 358/1.13 |
| 2015/0213347 A1* | 7/2015 | Anno | H04N 1/00954 358/1.9 |
| 2017/0068494 A1* | 3/2017 | Fukuda | G06F 3/1205 |
| 2019/0079708 A1* | 3/2019 | Yamada | G06F 3/1263 |
| 2019/0297211 A1* | 9/2019 | Tanaka | G06F 3/1205 |

FOREIGN PATENT DOCUMENTS

| | | |
|---|---|---|
| JP | 2015-170216 A | 9/2015 |
| JP | 2017-054496 A | 3/2017 |

OTHER PUBLICATIONS

Japanese Office Action dated Apr. 23, 2021 in counterpart Japanese patent application No. 2019-167489.

\* cited by examiner

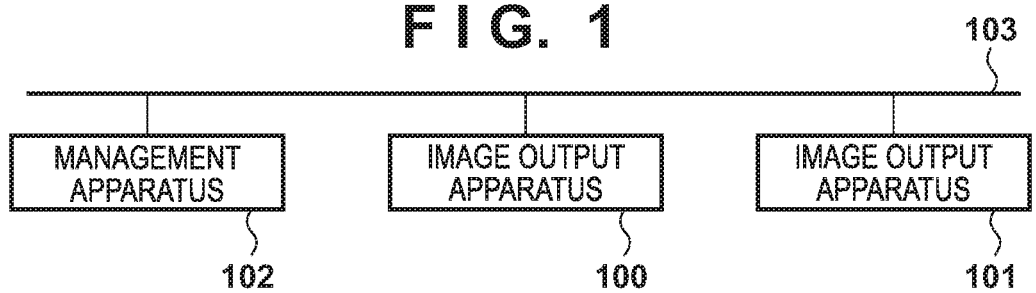
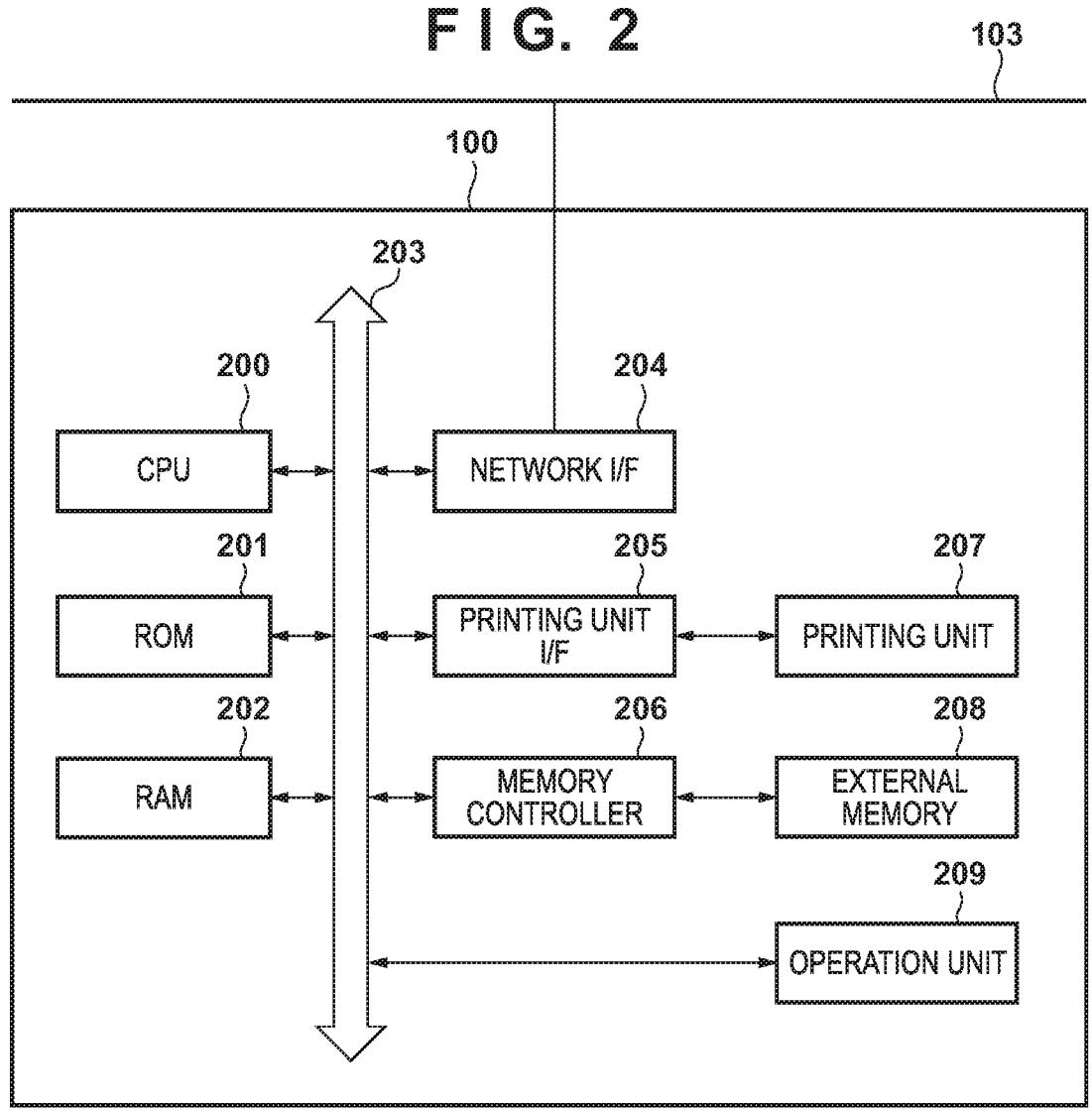

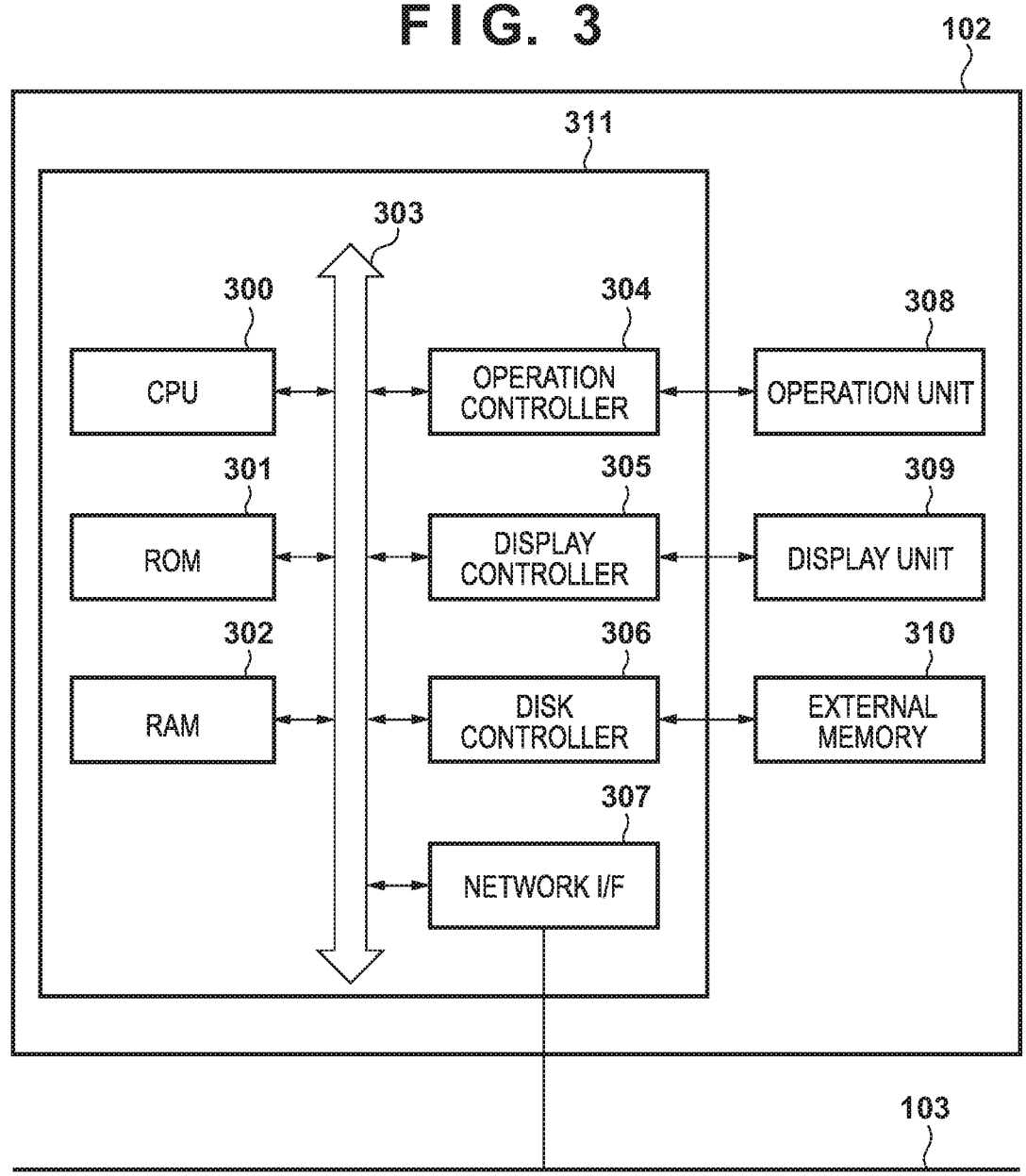

FIG. 4
| SHEET ID | SHEET NAME | CATEGORY | THICKNESS [mm] | GRAMMAGE [g/m²] | SURFACE QUALITY |
|---|---|---|---|---|---|
| SHEET ID-A | PLAIN PAPER A | PLAIN PAPER | 0.1 | 0.9 | MATTE |
| SHEET ID-B | GLOSSY PAPER A | PHOTO PAPER | 0.1 | 1.5 | SEMI-GLOSS |
| SHEET ID-C | GLOSSY PAPER B | PHOTO PAPER | 0.3 | 1.9 | GLOSS |
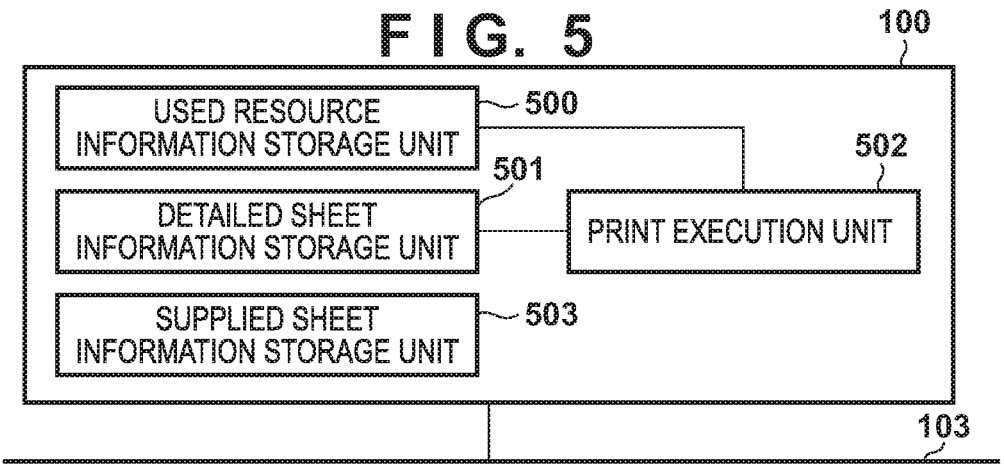
FIG. 5
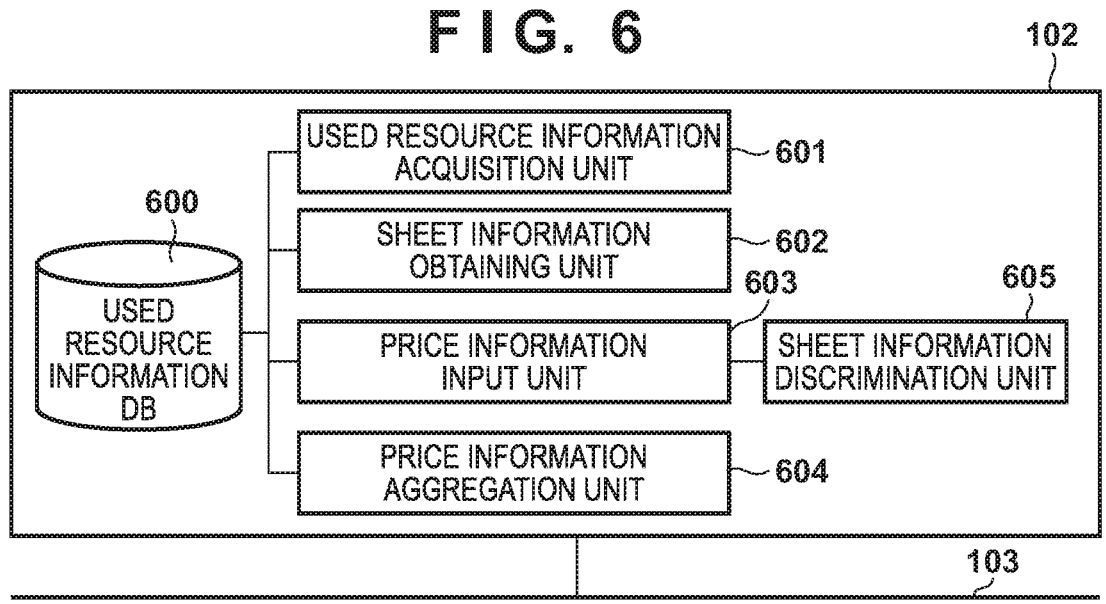
FIG. 6

F I G. 7A

700

SHEET PRICE SETTING

SHEET TYPE:
- PLAIN PAPER A
- SEMI-GLOSSY PAPER B  — 701

WIDTH: 500 mm
LENGTH: 10 m       } 702
PRICE: 1000 ¥

[SET] — 703

F I G. 7B

700

SHEET PRICE SETTING

SHEET TYPE:
- PLAIN PAPER A
- PLAIN PAPER B
- PLAIN PAPER C
- SEMI-GLOSSY PAPER A
- SEMI-GLOSSY PAPER B
- SEMI-GLOSSY PAPER C
- SEMI-GLOSSY PAPER D  — 704

WIDTH:
LENGTH:
PRICE:

[SET] — 703

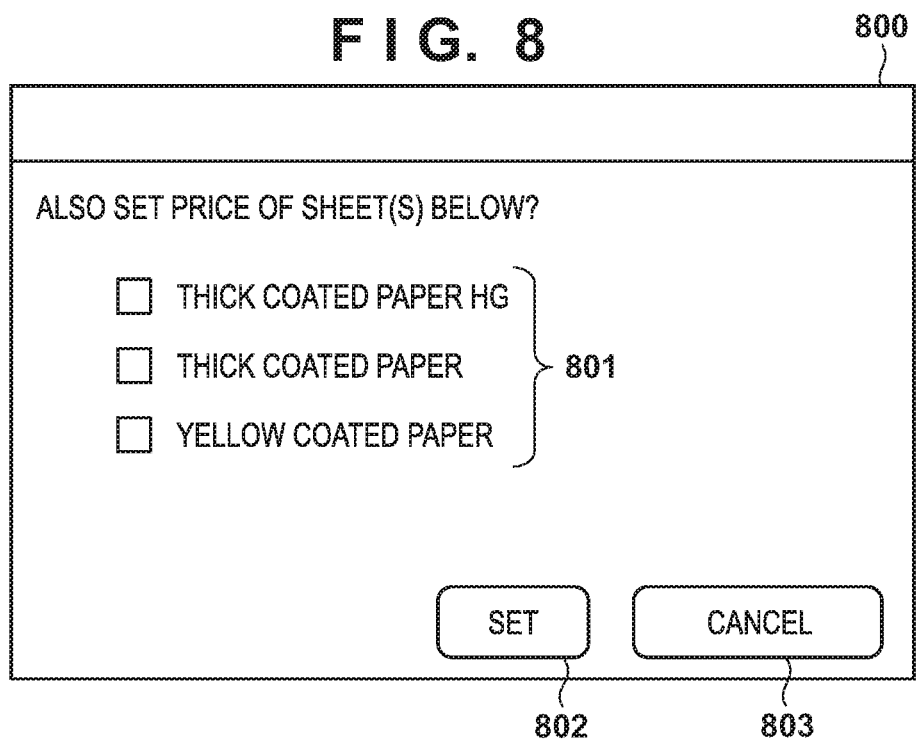

INFORMATION PROCESSING APPARATUS THAT CAN APPLY A PRICE SET FOR ONE SHEET TYPE TO ANOTHER SHEET TYPE, AND METHOD OF CONTROLLING THE SAME

BACKGROUND OF THE INVENTION

Field of the Invention

The present invention relates to an information processing apparatus and a method of controlling the same.

Description of the Related Art

Conventionally, there have been technologies that, when printing a job using an image output apparatus such as a printer, perform a cost calculation based on a printing agent used in printing or a sheet usage amount. By using such a function for cost calculation, a user is able to know the cost of printing and make use of it as information in operating the image output apparatus. In such a case, it is desirable for the calculated cost to be as accurate as possible.

In Japanese Patent Laid-Open No. 2010-244333, a technology in which, after setting a price of a sheet type used for printing, a cost calculation is performed based on a usage amount for that sheet is disclosed. Also, in Japanese Patent Laid-Open No. 2010-244333, a technology in which a sheet type for which a price has not been set is displayed as a candidate is disclosed.

However, in Japanese Patent Laid-Open No. 2010-244333, if the number of sheet types that are supported by the image output apparatus increases, there would be a risk that ease with which a user selects a desired sheet type may decrease.

SUMMARY OF THE INVENTION

The invention of the present application makes it possible to facilitate a setting operation for a sheet supported by the image output apparatus.

To solve the above problem, the invention of the present application comprises a following configuration. Thus, according to an aspect of the present invention, provided is an information processing apparatus comprising: at least one processor; and at least one memory configured to store a program, wherein the program when executed by the processor causes the information processing apparatus to perform an operation, the operation comprising: acquiring information of a sheet type used by an image output apparatus; providing a setting screen configured to accept setting operation for sheet types supported by the image output apparatus; and on the setting screen, among the sheet types supported by the image output apparatus, displaying the used sheet type indicated by the acquired sheet type information with priority over other sheet types.

According to another aspect of the invention, provided is an information processing apparatus comprising: at least one processor; and at least one memory configured to store a program, wherein the program when executed by the processor causes the information processing apparatus to perform an operation, the operation comprising: acquiring information of a sheet type used by an image output apparatus; performing cost aggregation using the acquired sheet type information; in a case where a sheet type subject to the cost aggregation comprises a sheet type for which a price has not been set, identifying a sheet type, for which a price has been set, comprising the same or a similar attribute as the sheet type for which a price has not been set; confirming whether or not to apply a price setting set for the identified sheet type to the sheet type for which a price has not been set; and in accordance with a confirmation result from the confirmation, applying a price setting to the sheet type for which a price has not been set, wherein the cost aggregation is performed based on an application result of the application of the price setting.

By virtue of the present invention, it becomes possible to facilitate a setting operation for a sheet supported by the image output apparatus.

Further features of the present invention will become apparent from the following description of exemplary embodiments with reference to the attached drawings.

BRIEF DESCRIPTION OF THE DRAWINGS

FIG. 1 is a diagram illustrating an example of a network configuration of a system according to an embodiment of the invention of the present application.

FIG. 2 is a diagram illustrating an example of a hardware configuration of an image output apparatus according to the embodiment of the invention of the present application.

FIG. 3 is a diagram illustrating an example of a hardware configuration of a management apparatus according to the embodiment of the invention of the present application.

FIG. 4 is a diagram illustrating an example of detailed sheet information according to the embodiment of the invention of the present application.

FIG. 5 is a diagram illustrating an example of a software configuration of the image output apparatus according to the embodiment of the invention of the present application.

FIG. 6 is a diagram illustrating an example of a software configuration of the management apparatus according to the embodiment of the invention of the present application.

FIG. 7A is a diagram illustrating an example of a price information input screen of the management apparatus according to the embodiment of the invention of the present application.

FIG. 7B is a diagram illustrating an example of the price information input screen of the management apparatus according to the embodiment of the invention of the present application.

FIG. 8 is a diagram illustrating an example of a message box of the management apparatus according to the embodiment of the invention of the present application.

DESCRIPTION OF THE EMBODIMENTS

Figure 9:
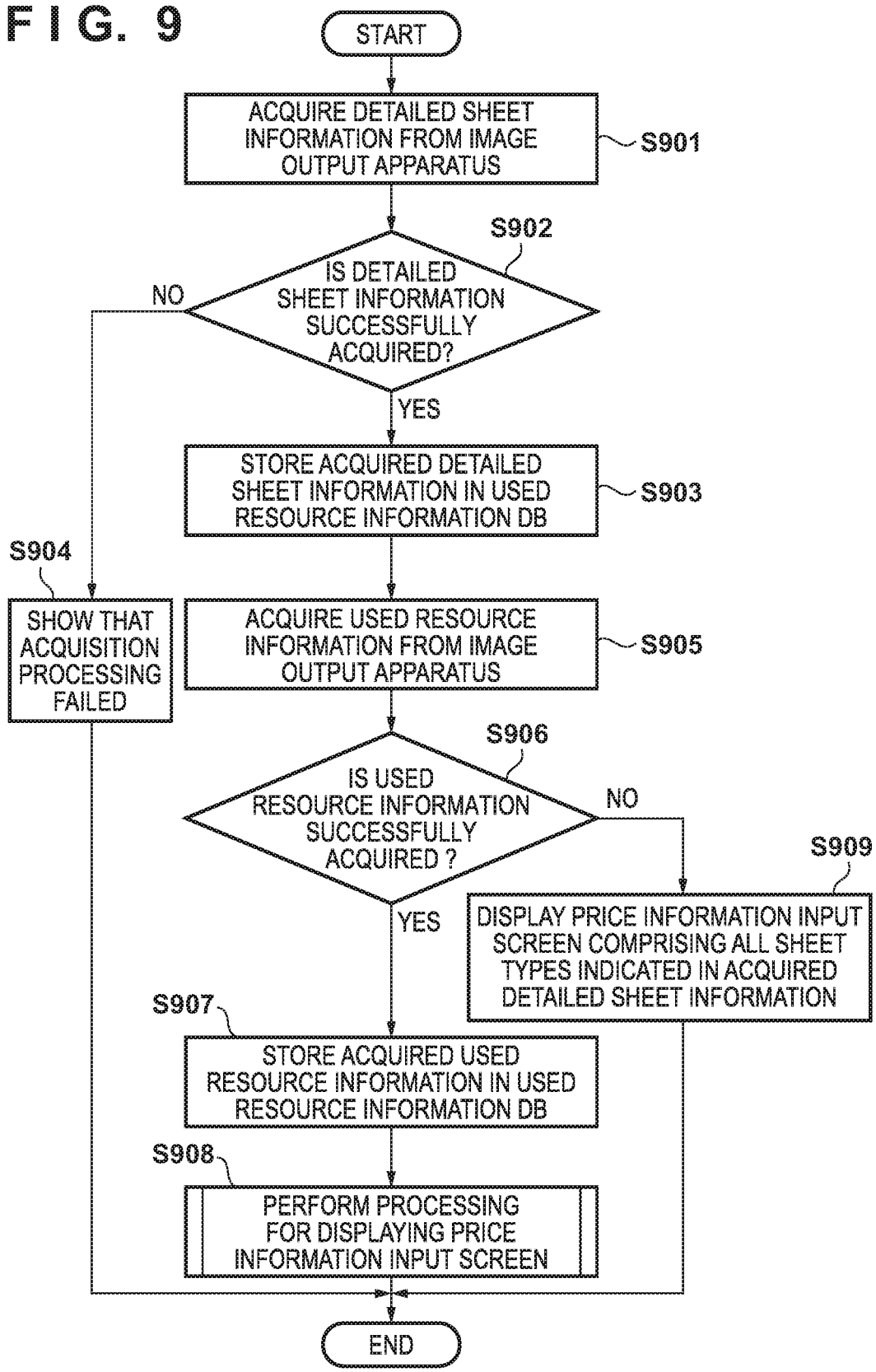
FIG. 9 is a flowchart for image output apparatus information obtaining processing in the management apparatus according to the embodiment of the invention of the present application.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

[System Configuration]

A system according to an embodiment of the invention of the present application will be explained. The system according to the present embodiment is a management system for one or a plurality of image output apparatuses. The image output apparatus stores used resource information related to various types of resources such as a printing agent (toner, ink, etc.) or a sheet used in printing. In the management system, a price is set for various types of resources, such as a printing agent or a sheet, used by the image output apparatus and based on the used resource information stored in the image output apparatus, cost aggregation is performed according to an amount of resources used in printing. The cost aggregation will be explained in a sixth embodiment.

When printing is performed in the image output apparatus, if sheet types used in printing vary, then a parameter, such as an amount of ejected printing agent, involved in printing may also vary. For this reason, in the image output apparatus, a parameter is registered by sheet type, and when printing, by applying a group of parameters corresponding to the sheet type used in printing, printing processing that corresponds to a sheet's property is achieved. In the explanation of the present embodiment, information of parameters grouped by sheet type is referred to as detailed sheet information.

FIG. 1 is a diagram illustrating an example of a system configuration according to the present embodiment. As illustrated in FIG. 1, a management apparatus 102, via a network 103, is connected so as to be able to communicate with image output apparatuses 100 and 101. The management apparatus 102 acquires the detailed sheet information and the used resource information registered in the image output apparatuses 100 and 101.

While an example in which two image output apparatuses are comprised in the management system is illustrated in the present embodiment, limitation is not made to this, and one, three, or more image output apparatuses may be included. Also, while an example in which one management apparatus is comprised in the management system is illustrated, limitation is not made to this, and two or more management apparatuses may be included.

While the image output apparatuses 100 and 101 are explained in the present embodiment as what is assumed to be an inkjet printer, it may be an electrographic method image output apparatus or an MFP (multi-function peripheral). The image output apparatuses 100 and 101 is capable of being supplied with a variety of sheet types and comprises a function for registering the detailed sheet information and a function for applying the detailed sheet information when printing. The management apparatus 102 is an information processing apparatus and comprises a function for collecting and aggregating the detailed sheet information and the used resource information registered in the image output apparatuses 100 and 101.

[Hardware Configuration]

FIG. 2 is a diagram illustrating an example of a hardware configuration of the image output apparatus according to the present embodiment. Also, in the present embodiment, both image output apparatuses are assumed to have the same configuration and to perform the same operation, and description below is given taking the image output apparatus 100 as an example. The image output apparatus 100 is controlled by a CPU (central processing unit) 200. The CPU 200 operates based on a control program and the like stored in a program ROM in a ROM (read only memory) 201 or a control program and the like stored in an external memory 208. The CPU 200, via a system bus 203, outputs an image signal serving as output information to a printing unit (printer engine) 207 connected to a printing unit I/F 205.

The CPU 200, via a network I/F 204, is able to perform communication processing with the management apparatus 102 and is able to notify the management apparatus 102 with information in the image output apparatus 100. Also, the CPU 200, via the network I/F 204, is able to receive from an external apparatus output data to be outputted to the printing unit 207. A RAM (random access memory) 202 is a RAM that functions as a main memory, a working area, and the like of the CPU 200 and is configured, by an optional RAM connected to an expansion port (not illustrated), so as to be able to expand memory capacity. Also, the RAM 202 is used as an output information development region, an environment data storage region, a non-volatile memory, and the like. An access to and from the external memory 208 comprising a hard disk (HDD), an IC card, and the like is controlled by a memory controller 206. The external memory 208 can be connected to, optionally, and stores font data, an emulation program, form data, information related to a sheet registered in the image output apparatus, sheet attribute information, and the like. Also, an operation unit 209 comprises an operation panel and is configured to be able to display various types of information.

Although not illustrated in FIG. 2, the image output apparatus 100 stores a sheet used for when printing is performed by the printing unit 207. For example, the image output apparatus 100 may comprise a paper feed source corresponding to a type or size of the sheet. Or, the image output apparatus 100 may use a rolled sheet for each sheet type. As for which sheet type to use, that is controlled by a printing job generated based on an instruction from a user.

FIG. 3 is a diagram illustrating an example of a hardware configuration of the information processing apparatus which is able to operate as the management apparatus 102 according to the present embodiment. A control unit 311 is configured to comprise a CPU 300, a ROM 301, a RAM 302, an operation unit controller 304, a display unit controller 305, a disk controller 306, and a network I/F 307.

The CPU 300, via the disk controller 306, reads out various kinds of programs such as a control program, a system program, and an application program from an external memory 310 to the RAM 302. The CPU 300 executes the various kinds of programs read out to the RAM 302 then performs various kinds of data processing as well as display control of a display unit 309. The CPU 300 may be configured to read out a control program or the like from the ROM 301. The CPU 300 may be an application-specific circuit such as an ASIC. The CPU 300 and the application-specific circuit are examples of a hardware circuit and a hardware processor.

The disk controller 306 controls access to and from the external memory 310 such as an FD, an HD, a CD-ROM, a DVD-ROM, an MD, or an MO. The RAM 302 is configured so as to be able to expand its capacity with an optional RAM (not illustrated) and is used mainly as a working area of the CPU 300.

The operation unit controller 304 controls input from an operation unit 308 such as a keyboard or a pointing device. The display unit controller 305 controls displaying of the display unit 309. Also, in the present embodiment, the CPU 300, via a main bus 303, controls each unit connected to the main bus 303 unless otherwise specified. The network I/F 204 is an interface for performing communication with the external apparatus.

[Detailed Sheet Information]

FIG. 4 is a diagram illustrating an example of the detailed sheet information according to the present embodiment. The detailed sheet information comprises information for a sheet ID 400, a sheet name 401, a category 402, a thickness 403, a grammage 404, a surface quality 405. The sheet ID 400 is identification information for uniquely identifying a sheet. The sheet name 401 is a name of the sheet and is used, for example, when displaying on a UI screen later described. The category 402 indicates a category to which the sheet belongs, and one or a plurality of sheets may belong to each category. Parameters such as the category 402, the thickness 403, the grammage 404, and the surface quality 405 indicate physical properties of the sheet. In most cases, a price of the sheet is calculated based on these physical properties. Note that the parameters may be managed in separate files by type, or a parameter type aside from the above may be comprised in the detailed sheet information. Also, in the example in FIG. 4, the thickness 403 gives [mm] as a unit and the grammage 404 gives [g/m2] as a unit, however, other units may be used.

[Software Configuration]

FIG. 5 is a diagram illustrating an example of function blocks of software or the like in the image output apparatus 100 according to the present embodiment. The image output apparatus 100 is configured to comprise a used resource information storage unit 500, a detailed sheet information storage unit 501, and a supplied sheet information storage unit 503. In the used resource information storage unit 500, information regarding a resource used by the image output apparatus 100 in printing is stored for each printing job. In the detailed sheet information storage unit 501, the detailed sheet information regarding the sheet type registered in the image output apparatus 100 is stored. The registered sheet type represents a type of recording medium (sheet) that can be used when the printing processing is performed by the image output apparatus 100. In the supplied sheet information storage unit 503, the sheet ID 400 corresponding to the sheet type that is currently supplied to the image output apparatus 100 is stored. The sheet type that is currently supplied are assumed to be immediately available without having sheet feeding operation performed. Note that stored in the supplied sheet information storage unit 503 may be history information of supplied sheets corresponding to the sheet type (or types) that has been supplied in the past. Each storage unit is configured, for example, in the ROM 201, the external memory 208, or the like.

A print execution unit 502, when the printing processing is executed in the image output apparatus 100, adopts the detailed sheet information stored in the detailed sheet information storage unit 501. Also, the print execution unit 502, after printing is executed, stores information regarding the resource used in the printing job to the used resource information storage unit 500.

FIG. 6 is a diagram illustrating an example of function blocks of software or the like in the management apparatus 102 according to the present embodiment. The management apparatus 102 is configured to comprise a used resource information DB 600, a used resource information acquisition unit 601, a sheet information obtaining unit 602, a price information input unit 603, a price information aggregation unit 604, and a sheet information discrimination unit 605. The used resource information DB 600 is a database for storing the used resource information and the detailed sheet information acquired from each image output apparatus. The used resource information acquisition unit 601 acquires the used resource information stored in the used resource information storage unit 500 of each image output apparatus. The sheet information obtaining unit 602 acquires the detailed sheet information stored in the detailed sheet information storage unit 501 and the history information of supplied sheets stored in the supplied sheet information storage unit 503 of each image output apparatus.

The price information input unit 603, based on the information stored in the used resource information DB 600, narrows down resources for which prices will be set and displays a UI screen on the display unit 309 of the management apparatus 102 corresponding to the result. Then, the price information input unit 603, on the displayed UI screen, receives a selection of resources, from among the resources, on which to perform a price setting, then performs the setting. Especially regarding the sheet type, the sheet information discrimination unit 605, based on the physical properties in the detailed sheet information, distinguishes whether or not an inputted price can be applied to other sheet types. The price information aggregation unit 604, based on the information stored in the used resource information DB 600 and the price set in the price information input unit 603, performs the cost aggregation. Processing details will be later described in a sixth embodiment.

[UI Screen]

FIGS. 7A and 7B illustrate configuration examples of setting screens, which serve as user interfaces that are provided by the management apparatus 102 according to the present embodiment, and are the setting screens on which the setting operation for the sheet type is received from the user. FIG. 7A illustrates an example of a price information input screen 700 displayed on the display unit 309 of the management apparatus 102. On the price information input screen 700, in a drop-down list 701, a list of sheet types for which a price setting will be performed is displayed, and the sheet type which will be subject to the setting can be selected. In the drop-down list 701, the sheet types narrowed down by the price information input unit 603 based on the used resource information from the image output apparatus 100 is displayed. In an input unit 702, for the sheet type selected from the drop-down list 701, price information such as a width, a length, and a price can be inputted. Once a setting button 703 is pressed (or touched), the price information inputted in the input unit 702 is associated with the sheet type selected from the drop-down list 701.

FIG. 7B illustrates a display example of the price information input screen 700 which is displayed on the display unit 309 of the management apparatus 102 when the used resource information cannot be acquired from the image output apparatus 100. In a drop-down list 704, the sheet types supported by the image output apparatus 100 is displayed. In the drop-down list 704, compared to the example in FIG. 7A, a list of sheet types enabled for selection that has not been narrowed down is displayed. Also in FIG. 7B, for the sheet type selected from the drop-down list 704, price information such as a width, a length, and a price inputted by the user will be associated.

In the present embodiment, when the setting button 703 is pressed, whether or not there exists a sheet, among the sheet types displayed in the drop-down list 701, to which the price information inputted in the input unit 702 can be applied is determined by the sheet information discrimination unit 605. Then, if it is determined that there is a sheet to which the inputted price information can be applied, a message box 800 such as the one in FIG. 8 is displayed. In the message box 800, the sheet types for which inputted price information were determined to be applicable is displayed in a list 801. In the list 801, a desired sheet type can be selected from among the sheet types displayed. The user selects a desired sheet from the list 801 then presses a setting button 802. With the operations above, the sheet type selected will also be associated with the price information inputted into the input unit 702 on the price information input screen 700. Also, by pressing a cancel button 803, the price setting for other sheet types can be canceled.

[Processing Flow]

(Acquisition Processing)

FIG. 9 is a flowchart for processing, in the management apparatus 102, the acquisition of information of the image output apparatus 100. The present processing flow, for example, is achieved by the CPU 300 of the management apparatus 102 reading out a program stored in the ROM 301 to the RAM 302, and then executing the program. Furthermore, the flowchart in FIG. 9 is executed at a predetermined timing while software related to the processing in the flowchart of the present embodiment is operating. An example of a predetermined timing is predetermined time of day. Also, other examples may be, for example, that FIG. 9 is executed at a timing when the user operates software and registers the image output apparatus 100 or that FIG. 9 is executed by the user operating an update button.

In step S901, the sheet information obtaining unit 602 executes acquisition processing of the detailed sheet information stored in the detailed sheet information storage unit 501 of the image output apparatus 100.

In step S902, the sheet information obtaining unit 602 determines whether or not the detailed sheet information was successfully acquired in step S901. In a case (no in step S902) where acquisition is unsuccessful, the processing proceeds to step S904, and in a case (yes in step S902) where acquisition succeeds, the processing proceeds to step S903.

In step S904, the sheet information obtaining unit 602 presents that the acquisition processing is unsuccessful. No particular limitation is made to a presentation method here, so an error message may be displayed on the display unit 309 or the acquisition processing ending unsuccessfully may be notified to a predetermined destination. Then, the present processing flow is terminated.

In step S903, the sheet information obtaining unit 602 stores the detailed sheet information acquired in step S901 in the used resource information DB 600.

In step S905, the used resource information acquisition unit 601 executes acquisition processing of the used resource information stored in the used resource information storage unit 500 of the image output apparatus 100. Here, the used resource information for acquisition may be only a part that is not stored in the used resource information DB 600.

In step S906, the used resource information acquisition unit 601 determines whether or not the used resource information was successfully acquired in step S905. In a case (no in step S906) where acquisition of the used resource information is unsuccessful, the processing proceeds to step S909, and in a case (yes in step S906) where acquisition succeeds, the processing proceeds to step S907.

In step S907, the used resource information acquisition unit 601 stores the information acquired in step S905 in the used resource information DB 600. Then, the processing advances to step S908.

In step S908, the price information input unit 603 performs display processing of the price information input screen 700 using the detailed sheet information acquired in step S901. Details regarding the display processing here will be described later using FIG. 10. In this case, as illustrated in FIG. 7A, based on the used resource information, after the sheet type that can be selected has been narrowed down from the sheet types supported by the image output apparatus 100, the drop-down list is displayed. Then, the present processing flow is terminated.

In step S909, the price information input unit 603, using a drop-down list comprising all of the sheet types shown in the detailed sheet information acquired in step S901, performs a display of the price information input screen 700. In this case, as illustrated in FIG. 7B, all of the sheet types supported by the image output apparatus 100 are displayed in the drop-down list so as to be selectable.

Furthermore, in the FIG. 9 processing, the processing from steps S901 to S904 and from S905 to S908 may be executed at separate timings. Also, in the FIG. 9 example, a procedure in which the price information input screen 700 is displayed is explained in the processing for the management apparatus 102 to acquire information from the image output apparatus 100; however, limitation is not made to this. The price information input screen 700 may be configured so as to be caused to be displayed by the user's instruction.

(Display Processing)

Figure 10:
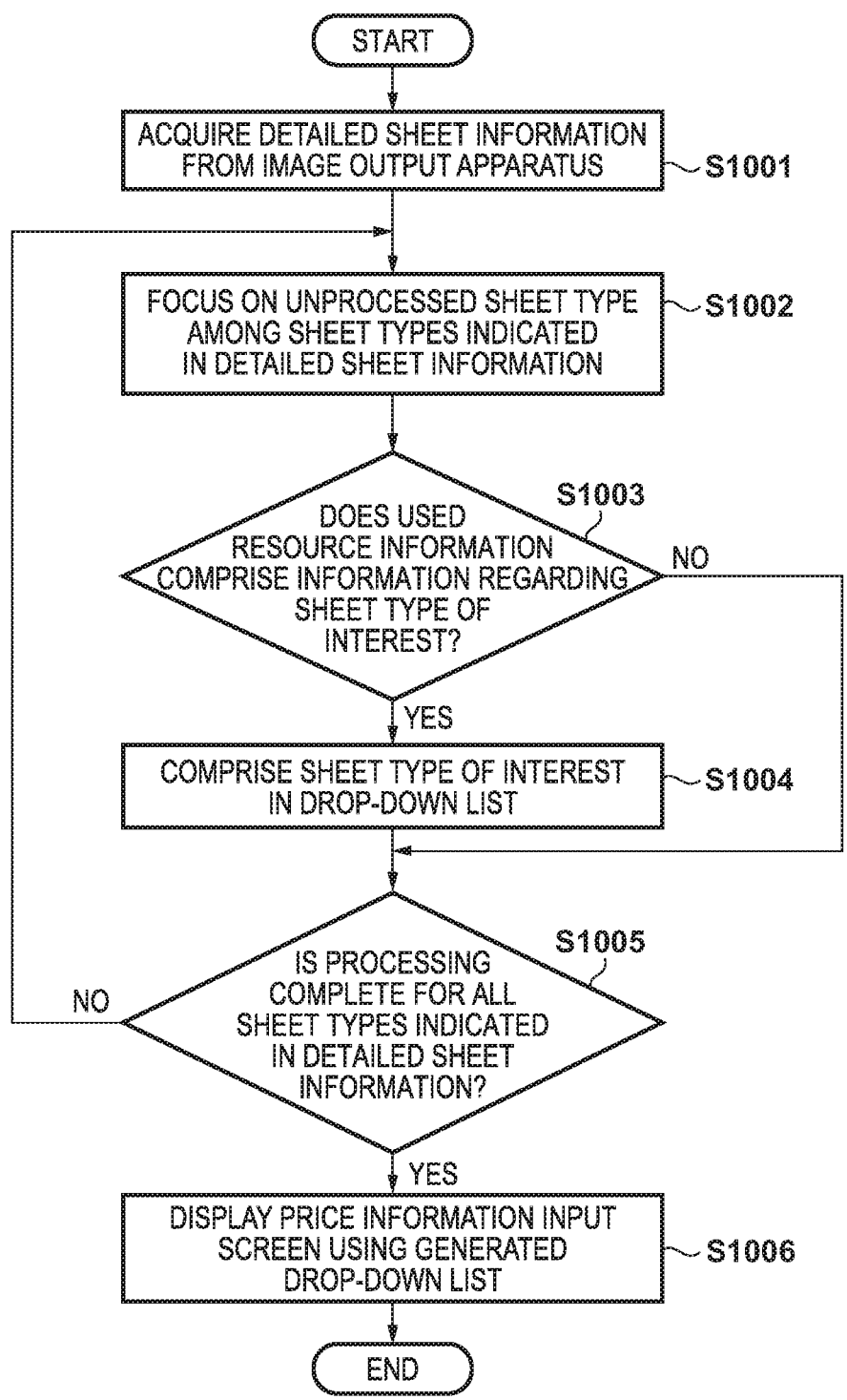
FIG. 10 is a flowchart for display processing in the price information input screen of the management apparatus according to the embodiment of the invention of the present application.

FIG. 10 is a flowchart for the display processing of the price information input screen 700 executed in the step S908 in FIG. 9. The present processing flow, for example, is achieved by the CPU 300 of the management apparatus 102 reading out a program stored in the ROM 301 to the RAM 302, and then executing the program. Also, the present processing flow is executed when a request has been made to display the price information input screen 700 on the display unit 309 of the management apparatus 102.

In step S1001, the price information input unit 603 acquires the used resource information and the detailed sheet information stored in the used resource information DB 600 then passes them to the sheet information discrimination unit 605.

In step S1002, the sheet information discrimination unit 605, among the sheet types comprised in the detailed sheet information passed over in step S1001, focuses on the sheet types that are unprocessed.

In step S1003, the sheet information discrimination unit 605 confirms whether or not the used resource information passed over in step S1001 comprises information related to the sheet types of interest. In other words, it determines whether or not sheets of the sheet types of interest on has been used in the printing processing the image output apparatus 100 based on the used resource information. In a case (no in step S1003) where information related to the sheet types of interest is not comprised in the used resource information, the processing proceeds to step S1005. Whereas in a case (yes in step S1003) where information related to the sheet types of interest is comprised in the used resource information, the processing proceeds to step S1004.

In step S1004, the sheet information discrimination unit 605 includes the sheet name 401 of the sheet type of interest in the drop-down list on the price information input screen 700. Then, the processing advances to step S1005.

In step S1005, the sheet information discrimination unit 605, determines whether or not processing for all sheet types comprised in the detailed sheet information passed over in step S1001 has been completed. In a case (yes in step S1005) where the processing is complete, the processing proceeds to step S1006. In a case (no in step S1005) where the processing is incomplete, the processing returns to step S1002 and repeats the processing focusing on the sheet types that are unprocessed.

In step S1006, the price information input unit 603, based on content of the drop-down list generated, displays the price information input screen 700. Then, the present processing flow is terminated.

The above flowchart in FIG. 10 makes it so that selection items of the sheet types are narrowed-down then displayed, thereby improving operability of operation for the user to select the sheet type.

Furthermore, the flowchart in FIG. 10 makes it so that the sheet types used in the printing processing of the image output apparatus 100 are displayed and the sheet types not used are not displayed, but may be another display mode. For example, a configuration may be so that the sheet types used in the printing processing of the image output apparatus 100 takes priority over the sheet types not used in the printing processing of the image output apparatus 100 when displayed. To take priority when displayed, for example, is a method for displaying the sheet types used in the printing processing at the top of the drop-down list and for displaying the sheet types not used in the printing processing at the bottom of the drop-down list. Also, to take priority when displayed, for example, may be a method for displaying the sheet types used in the printing processing in the drop-down list to be more noticeable than the sheet types not used in the printing processing. A noticeable display is a method for displaying the sheet types used in the printing processing and the sheet types not used in the printing processing with different colors. Also, another method may be a method for displaying a text string of the sheet types used in the printing processing to be thicker and a text string of the sheet types not used in the printing processing.

(Price Setting Processing)

Figure 11:
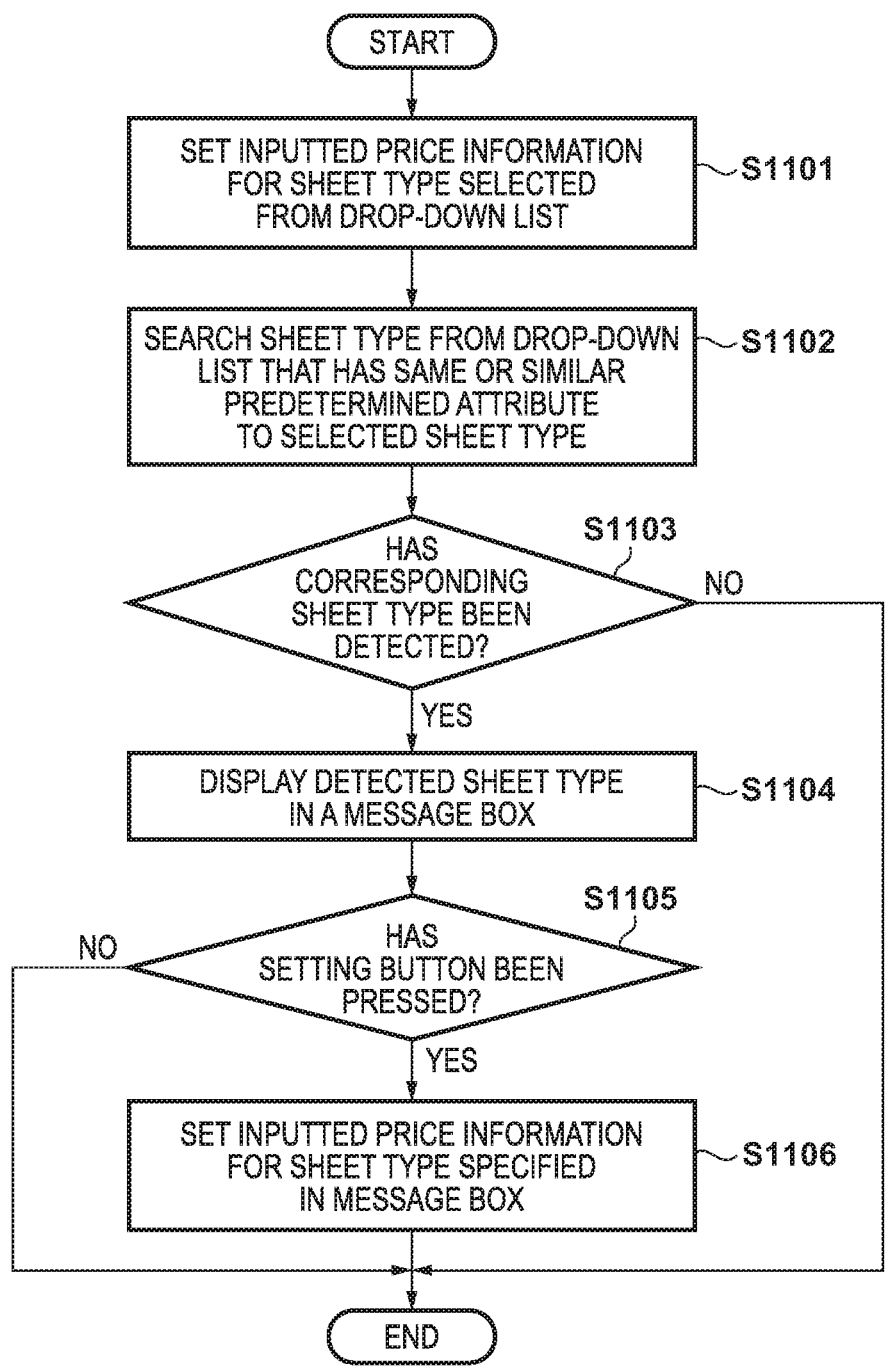
FIG. 11 is a flowchart for the price setting processing in the management apparatus according to the embodiment of the invention of the present application.

FIG. 11 is a flowchart for the price setting processing according to the present embodiment. The present processing flow, for example, is achieved by the CPU 300 of the management apparatus 102 reading out a program stored in the ROM 301 to the RAM 302, and then executing the program. On the price information input screen 700 displayed on the display unit 309 of the management apparatus 102, when the desired sheet type is selected from the drop-down list 701, then the setting button 703 is pressed, the present processing flow is started.

In step S1101, the price information input unit 603 sets the price information inputted in the input unit 702 to the sheet type selected from the drop-down list 701. The set price information is stored in the used resource information DB 600 or the like.

In step S1102, the price information input unit 603 passes information related to the sheet types displayed in the drop-down list 701 to the sheet information discrimination unit 605. Then, the sheet information discrimination unit 605, from among the sheet types comprised in the drop-down list 701, searches for the sheet types that match or resemble a predetermined attribute of the sheet type for which the price information was set in step S1101. Here, a predetermined attribute corresponds to at least one of the category 402, the thickness 403, the grammage 404, or the surface quality 405 comprised in the detailed sheet information. Also, a threshold value used for when determining a sheet type similarity is assumed to be preset and to be stored in the storage unit.

In step S1103, the price information input unit 603, as a result of searching in step S1102, determines whether or not a corresponding sheet type is detected. In a case (no in step S1103) where it is not detected, the present processing flow is terminated, and in a case (yes in step S1103) where it is detected, the processing proceeds to step S1104.

In step S1104, the price information input unit 603 displays the message box 800. Here, in the message box 800, the list 801 comprising the sheet name 401 of the sheet types detected in step S1102 is shown. Also, in a case where a plurality of sheet types are detected in step S1102, as illustrated in FIG. 8, a plurality of sheet types are shown in the list 801.

In step S1105, the price information input unit 603, in the message box 800, determines whether or not the setting button 802 is pressed with the desired sheet types selected from the list 801. In a case (yes in step S1105) where the button is pressed, the processing proceeds to step S1106, and in a case where the button is not pressed, in other words, in a case (no in step S1105) where by the cancel button 803 being pressed, the setting has been canceled, the present processing flow is terminated.

In step S1106, the price information input unit 603 sets the price information for the sheet type selected from the list 801 in the message box 800 set in step S1101. The set price information is stored in the used resource information DB 600 or the like. Then, the present processing flow is terminated.

As described above, by the flowchart in FIG. 11, it becomes possible to easily set the same price information to another sheet type similar to the sheet type for which the price information has been set.

As described above, in the present embodiment, when setting price information for a sheet type, the sheet types used in printing is display so as to be enabled for selection. This makes it so that not all the sheet types supported by the image output apparatus is displayed allowing the user to easily perform a price setting operation for the sheet types that they used.

Second Embodiment

Another embodiment of the invention of the present application is described. Note that in the following descriptions for each embodiment, a description regarding a configuration that overlaps with the first embodiment will be omitted, and a description for an aspect of each embodiment will be given. In the present embodiment, a display order of sheet types displayed in the drop-down list 701 of the price information input screen 700 illustrated in FIGS. 7A and 7B is further explained. For example, there are cases where by displaying the sheet types for which a price input is recommended at the top, operation for selecting a sheet type becomes easy.

For example, with reference to the used resource information, the sheet types may be displayed in the drop-down list 701 in the order of most usage amount in square meters. Or the sheet types may be displayed in the drop-down list 701 in the order of the highest usage count. This makes it possible, when compared to the first embodiment, to perform the operation for setting a sheet type price more easily.

Third Embodiment

Another embodiment of the invention of the present application is described. In the first embodiment, the sheet types to be displayed in the drop-down list 701 was determined based on a usage record (used resource information) of sheet types. However, in a case where a sheet type that has not been used but is highly likely to be used in the future is supplied, it is advantageous, in terms of operation, to be able to set a price in the price information input screen 700.

In the present embodiment, in step S901 in FIG. 9, the sheet information obtaining unit 602, from the supplied sheet information storage unit 503 of the image output apparatus 100, also acquires the sheet ID 400 corresponding to a sheet type that is currently supplied to the image output apparatus 100. Furthermore, in step S1004 in FIG. 10, the price information input unit 603, in the drop-down list on the price information input screen 700, includes the sheet name 401 of the sheet type corresponding to the sheet ID 400 acquired in the above.

This makes it possible, even for a sheet type that has not been used, to display a sheet type that is currently supplied to the image output apparatus in the drop-down list 701 on the price information input screen 700. Therefore, it becomes possible to easily perform the price setting operation for a sheet type that is highly likely to be used.

Fourth Embodiment

Another embodiment of the invention of the present application is described. In the present embodiment, a display order of sheet types displayed or an existence/absence of display in the drop-down list 701 of the price information input screen 700 illustrated in FIGS. 7A and 7B is further explained. For example, there are cases where, by changing the display order or an existence/absence of display depending on a setting state, it makes it possible for the user to easily determine whether or not to set a price. Here, some examples of setting states may be whether or not a price has been set or whether or not a price of another sheet type has been applied via the message box 800 illustrated in FIG. 8. In a case where a price setting of another sheet type is used via the message box 800 in FIG. 8, that may be managed in the used resource information DB 600 or the like.

In the present embodiment, according to the above setting states, the display order or the presence/absence of display of the drop-down list 701 on the price information input screen 700 is changed. For example, regarding the sheet type for which the price has been set, it may be controlled so as not to be displayed in the drop-down list 701. In this case, the price information input unit 603, in step S1004 in FIG. 10, removes the above sheet type for which the price has been set from the drop-down list. Also, regarding the sheet type for which the price has been set or to which the price of another sheet type has been applied, a sorting order control may be performed so that they are displayed at the bottom of the drop-down list. Or, regarding the sheet type for which the price has not been set, a sorting order control may be performed so that it is displayed at the top of the drop-down list.

As described above, in the present embodiment, according to the price information setting conditions, a display order or the presence/absence of display regarding the drop-down list is controlled. By this, in addition to the effects of the first embodiment, it becomes possible to optimize the setting of price information by the user.

Fifth Embodiment

Another embodiment of the invention of the present application is described. In the first embodiment, in the message box 800 in FIG. 8, control is performed such that it is possible to also set the price information for other sheet types of the same or a similar category or physical properties. Another embodiment may be configured so as to set a price by category using a sheet type group (category 402) in which each sheet type belongs.

Figure 12:
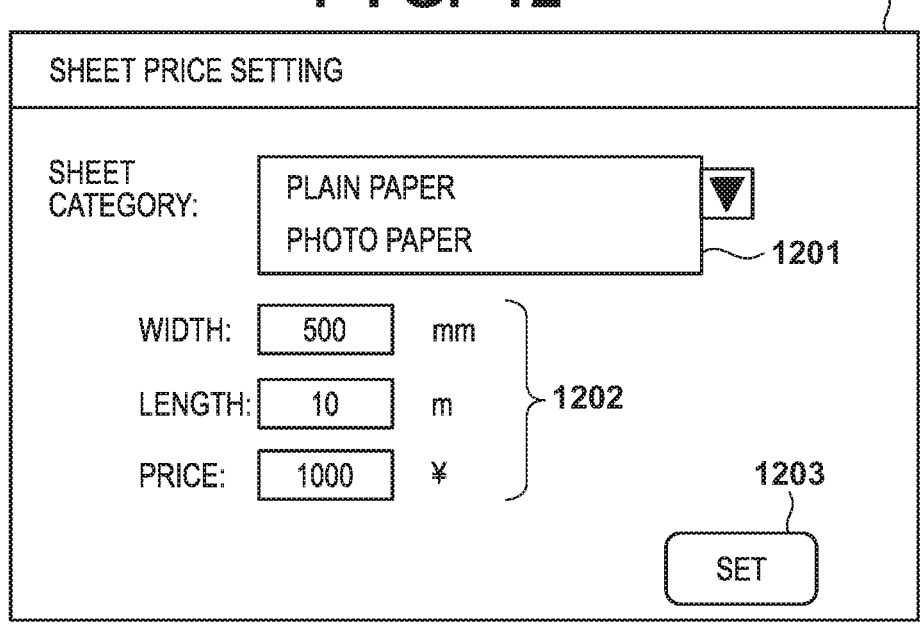
FIG. 12 is a diagram illustrating an example of a price information input screen in the management apparatus according to a fifth embodiment.

FIG. 12 is a diagram illustrating an example of a price information input screen 1200 based on a sheet type category displayed by the display unit 309 of the management apparatus 102 according to the present embodiment. Comprised in a drop-down list 1201 on the price information input screen 1200, instead of the drop-down list 701 in FIG. 7A described in the first embodiment, is the drop-down list 1201 which can be selected by sheet type category. Information that is inputted into the input unit 1202, by a desired category being selected from the drop-down list then a setting button 1203 being pressed, is set for a sheet type belonging to the category selected from the drop-down list 1201.

In the present embodiment, by the processing in FIG. 10 described in the first embodiment, each sheet type category is determined whether or not to be comprised in the drop-down list 1201. Note that in a case where it is shown in the used resource information that among one or a plurality of sheet types belonging to a category, at least one has been used, control may be taken so as to comprise that category in the drop-down list 1201.

Also, a configuration may be taken so that it is possible for the user to select whether to set (the price information input screen 700 in FIGS. 7A and 7B) a price by sheet type or to set (the price information input screen 1200 in FIG. 12) a price by category.

As described above, according to the present embodiment, it becomes possible to set a price by sheet type category thereby making it possible to optimize the price setting by the user.

Sixth Embodiment

Another embodiment of the invention of the present application is described. In the present embodiment, an embodiment considering a case where cost is aggregated based on a printing record is described. For example, in a case a sheet types for which a price is not set is present when executing cost aggregation, there is a need for setting the price of the sheet type on the price information input screen. Note that in the present embodiment, the processing explained using FIG. 11 in the first embodiment is executed. As a result, even after the cost aggregation has been started, the sheet type information for which a price has been set is applied to the sheet types for which a price has not been set thereby enabling to improve user operability.

[Cost Aggregation Processing]

Figure 13:
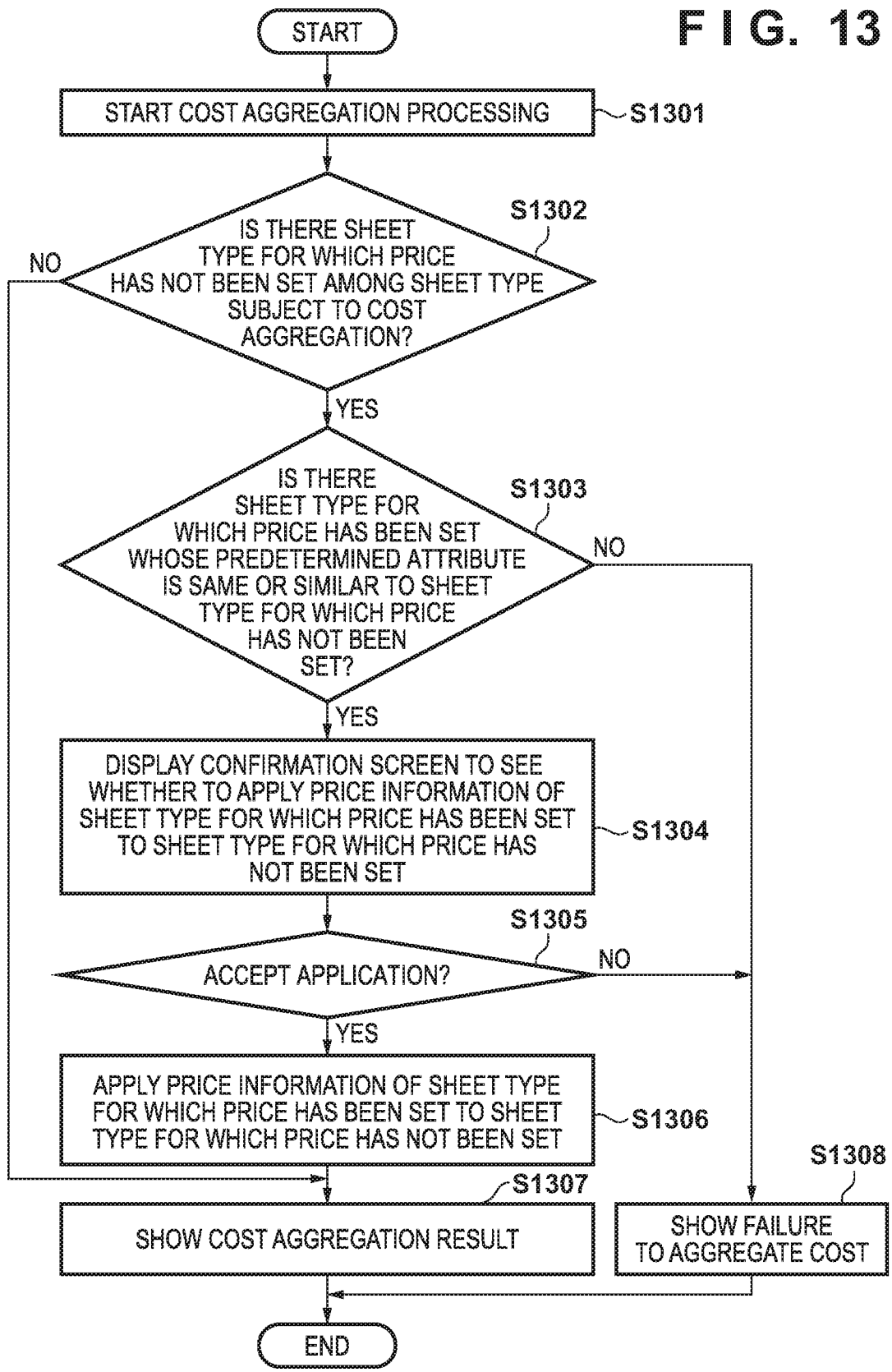
FIG. 13 is a flowchart for cost aggregation processing in the management apparatus according to a sixth embodiment.

FIG. 13 is a flowchart of processing for aggregating cost in the price information aggregation unit 604 according to the present embodiment. The present processing flow, for example, is achieved by the CPU 300 of the management apparatus 102 reading out a program stored in the ROM 301 to the RAM 302, and then executing the program. The present processing flow may be started based on a user instruction or be executed at a desired preset timing.

In step S1301, the price information aggregation unit 604 starts the cost aggregation processing. No particular limitation is made to details of the cost aggregation processing, and a desired method may be employed.

In step S1302, the price information aggregation unit 604, among sheet types subject to cost aggregation, determines whether or not there is a sheet type for which a price has not been set. In a case (no in step S1302) where it is determined that there is no sheet type for which a price has not been set, the processing proceeds to S1307, and in a case (yes in step S1302) where it is determined that there is that sheet type, the processing proceeds to S1303.

In step S1303, the price information aggregation unit 604, from among the sheet information for which a price has been set, searches for the sheet types that match or resemble a predetermined attribute of the sheet type, identified in step S1302, for which the price information has not been set. Here, the predetermined attribute corresponds to at least one of the category 402, the thickness 403, the grammage 404, or the surface quality 405 comprised in the detailed sheet information. Also, a threshold value used for when determining a sheet type similarity is assumed to be preset and to be stored in the storage unit. Then, the price information aggregation unit 604 determines whether or not there is a sheet type for which a price has been set that match or resemble a predetermined attribute of the sheet type for which a price has not been set. In a case (no in step S1303) where it is determined that there is no sheet type for which a price has been set, the processing proceeds to S1308, and in a case (yes in step S1303) where it is determined that there is that sheet type, the processing proceeds to S1304.

In step S1304, the price information aggregation unit 604 presents the user with the price information of the sheet types, detected in step S1303, for which a price has been set to see whether or not the information can be applied to a sheet type for which a price has not been set. Here, the presentation, for example, may be performed by displaying on a confirmation screen (not illustrated) a width, length, and price setting as well as the detailed sheet information for every sheet type for which a price has or has not been set.

In step S1305, the price information aggregation unit 604, via the confirmation screen presented in step S1304, determines whether or not an application of the price information has been accepted. For example, an approve button (not illustrated) may be arranged on the confirmation screen for a confirmation results to be determined based on whether or not the approve button has been pressed, and in a case (no in step S1305) where the application has not been accepted, the processing proceeds to step S1308, and in a case (yes in step S1305) where the application has been accepted, the processing proceeds to step S1306.

In step S1306, the price information aggregation unit 604 applies the price information of the sheet type for which the price setting has been accepted to the sheet type for which a price has not been set. Then, the processing proceeds to step S1307.

In step S1307, the price information aggregation unit 604, based on the price information that serves as an application result, presents a result of the cost aggregation processing. Here, no particular limitation is made to the presentation method, and the result may be displayed on a UI screen (not illustrated) or be outputted to a predetermined storage unit as aggregate data. Then, the present processing flow is terminated.

In step S1308, the price information aggregation unit 604 presents that the cost aggregation processing was unsuccessful. Here, no particular limitation is made to the presentation method, and an error screen (not illustrated) may be displayed or a log may be outputted to a predetermined storage unit. Then, the present processing flow is terminated.

Also, in the confirmation screen displayed in step S1304, a configuration may be taken so that the user is able to revise the presented price information setting.

As described above, according to the present embodiment, even in a case where a price is not set for the sheet types when performing the cost aggregation processing, it becomes possible to make the user's setting operation easy.

Seventh Embodiment

Another embodiment of the invention of the present application is described. In the first embodiment, the description is given using the image output apparatus 100 as an example. However, as illustrated in FIG. 1, there may be a case where a plurality of the image output apparatus may be managed by the management apparatus 102.

In such a case, a configuration may be taken so that for the plurality of image output apparatuses, the information obtaining processing in FIG. 9 and the display processing in FIG. 10 of the first embodiment may be executed individually. Or, a configuration may be taken so as to share the price setting information of the plurality of image output apparatuses. For example, it is assumed that the image output apparatus 100 and the image output apparatus 101 support the same or a similar sheet types. Then, when a price setting is performed for the sheet type of the image output apparatus 100, if a price has not been set for the same sheet type in the image output apparatus 101, a screen similar to the one illustrated in FIG. 8 is displayed. Then, whether or not to also perform the price setting for the sheet type in the image output apparatus 101 may be confirmed.

According to the present embodiment, in a case where the same or a similar sheet types are used in a plurality of image output apparatuses, it becomes possible to optimize the price information setting by the user.

Note that each embodiment described above is not necessarily exclusive of one another but may be combined or switched as desired.

Other Embodiments

Note that in the embodiments described above, the sheet type price setting has been described as an example, however, the processing of the embodiments described above may be executed in a case different from the price setting. For example, in a case where the sheet information regarding a width, a length, or the like is set, the processing of the embodiments described above may be executed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-167489, filed Sep. 13, 2019 which is hereby incorporated by reference herein in its entirety.

What is claimed is:

1. An information processing apparatus comprising:
  at least one processor; and
  at least one memory configured to store a program, wherein the program when executed by the processor causes the information processing apparatus to perform operations, the operations comprising:
    acquiring information of a sheet type that an image output apparatus has used for printing processing;
    providing a setting screen configured to accept setting operation for sheet types supported by the image output apparatus;
    on the setting screen, among the sheet types supported by the image output apparatus, displaying the used sheet type indicated by the acquired sheet type information with priority over other sheet types;
    in a case where a price setting corresponding to a first sheet type is accepted via the setting screen, identifying a second sheet type comprising the same or a similar attribute as the first sheet type for which a price has not been set;
    confirming whether or not to apply the price setting corresponding to the first sheet type to the identified second sheet type; and
    in accordance with a confirmation result, applying the price setting to the second sheet type.

2. The information processing apparatus according to claim 1, wherein
  the providing of the setting screen is executed as processing to display the used sheet type indicated by the acquired sheet type information, among sheet types supported by the image output apparatus, with priority over other sheet types;
  the processing to display the used sheet type indicated by the acquired sheet type is executed; and
  the processing to not display on the setting screen the other sheet types is executed.

3. The information processing apparatus according to claim 1, wherein
  the providing of the setting screen, as processing to display the used sheet type indicated by the acquired sheet type information, among sheet types supported by the image output apparatus, with priority over other sheet types, executes the processing to cause a sheet type indicated by the acquired sheet type information to be displayed in a higher level than the other sheet types.

4. The information processing apparatus according to claim 1, wherein
  the acquiring acquires a price setting of sheet types supported by each of a plurality of image output apparatuses; and
  the operation further comprises:
    when a price setting corresponding to a first sheet type for a first image output apparatus, among a plurality of image output apparatuses, is accepted via the setting screen, identifying a second sheet type which comprises the same or a similar attribute as the first sheet type and is supported by a second image output apparatus among a plurality of image output apparatuses and for which a price has not been set;
    confirming whether or not to apply a price setting corresponding to the first sheet type to the identified second sheet type; and
    in accordance with a confirmation result from the confirmation, applying a price setting to the second sheet type.

5. The information processing apparatus according to claim 1, wherein
  the attribute is based on at least one of a category to which a sheet type belongs or a thickness, a grammage, or a surface quality of a sheet type.

6. The information processing apparatus according to claim 1, wherein
  the operation further comprises:
    acquiring information for a sheet type supplied to the image output apparatus, and wherein
    the providing of the setting screen displays, on the setting screen, the used sheet type and the supplied sheet type indicated by the acquired sheet type information, among sheet types supported by the image output apparatus, with priority over other sheet types.

7. The information processing apparatus according to claim 1, wherein
  the providing of the setting screen displays, on the setting screen, sheet types in a sorting order based on at least one of a usage amount in square meters or a usage count of the used sheet type indicated by the acquired sheet type information.

8. The information processing apparatus according to claim 1, wherein
  the providing of the setting screen does not display, on the setting screen, a sheet type for which a price has been set, among sheet types supported by the image output apparatus, so as to be selectable as a setting target.

9. The information processing apparatus according to claim 1, wherein information regarding a width and a length of a sheet is displayed on the setting screen.

10. A control method of an information processing apparatus, the method comprising:
  acquiring information of a sheet type that an image output apparatus has used for printing processing;
  providing a setting screen configured to accept setting operation for sheet types supported by the image output apparatus;
  in providing the setting screen, displaying, on the setting screen, the sheet type indicated by the acquired sheet type information, among sheet types supported by the image output apparatus, with priority over other sheet types;
  in a case where a price setting corresponding to a first sheet type is accepted via the setting screen, identifying a second sheet type comprising the same or a similar attribute as the first sheet type for which a price has not been set;
  confirming whether or not to apply the price setting corresponding to the first sheet type to the identified second sheet type; and in accordance with a confirmation result, applying a price setting to the second sheet type.

11. The control method according to claim 10, wherein as processing to display the used sheet type indicated by the acquired sheet type information, among sheet types supported by the image output apparatus, with priority over other sheet types, the used sheet type indicated by the acquired sheet type information is made to display on the setting screen, and processing to not display other sheet types on the setting screen is executed.

12. The control method according to claim 10, wherein the providing of the setting screen, as processing to display the used sheet type indicated by the acquired sheet type information, among sheet types supported by the image output apparatus, with priority over other sheet types, executes the processing to cause a sheet type indicated by the acquired sheet type information to be displayed in a higher level than the other sheet types.

13. The control method according to claim 10, further comprising:

acquiring information for a sheet type supplied to the image output apparatus, and wherein the providing of the setting screen displays, on the setting screen, the used sheet type and the supplied sheet type indicated by the acquired sheet type information, among sheet types supported by the image output apparatus, with priority over other sheet types.

14. The control method according to claim 10, wherein the providing of the setting screen displays, on the setting screen, sheet types in a sorting order based on at least one of a usage amount in square meters or a usage count of the used sheet type indicated by the acquired sheet type information.

15. The control method according to claim 10, wherein the providing of the setting screen does not display, on the setting screen, a sheet type for which a price has been set, among sheet types supported by the image output apparatus, so as to be selectable as a setting target.

16. The control method according to claim 10, wherein information regarding a width and a length of a sheet is displayed on the setting screen.

* * * * *